Dec. 15, 1953    H. S. McGOWAN    2,662,422
SPEED REDUCER
Filed March 24, 1952

INVENTOR.
HAROLD S. McGOWAN
BY Morin Moody
ATTORNEY

Patented Dec. 15, 1953

2,662,422

UNITED STATES PATENT OFFICE 2,662,422

SPEED REDUCER

Harold S. McGowan, Cedar Rapids, Iowa, assignor to Collins Radio Company, Cedar Rapids, Iowa, a corporation of Iowa Application March 24, 1952, Serial No. 278,225

5 Claims. (Cl. 74—810)

This apparatus relates in general to a speed reducer and in particular to a mechanism which automatically shifts into a lower gear ratio when reversal of direction of rotation is made.

It is an object of this invention to provide a speed reducer which is actuated upon reversal of the driving mechanism.

Another object of this invention is to provide a self-shifting speed reducer.

A feature of this invention is found in the provision for a controlled shaft which may be driven directly from a driving means and a secondary gear arrangement which drives the controlled shaft at a slow rate when a reversal of direction of rotation is made.

At times it is desired to have a reduction of speed upon change of direction of rotation. For example, in tuning a radio transmitter it is desirable to go from one end of the range to the other at a rapid speed so as to consume a minimum amount of time in making the change. However, when fine tuning is made in the vicinity of the correct frequency a much slower speed is desirable. The present invention illustrates one manner of solving this problem.

Further features, objects, and advantages of this invention will become apparent from the following description and claims when read in view of the drawings, in which:

Figure 1:
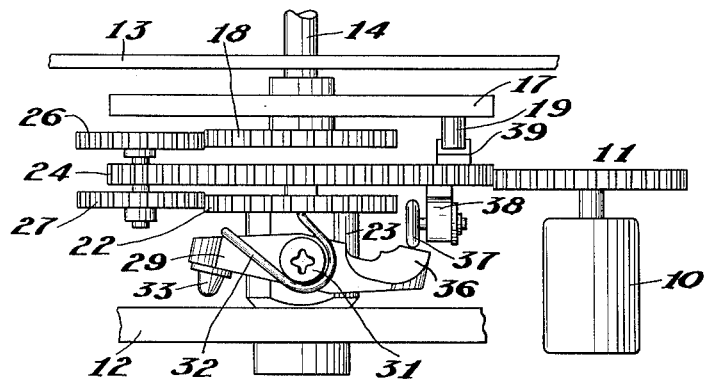
Figure 1 is a top view of the speed reducing mechanism of this invention.
Figure 3:
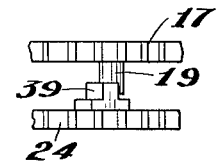
Figure 2:
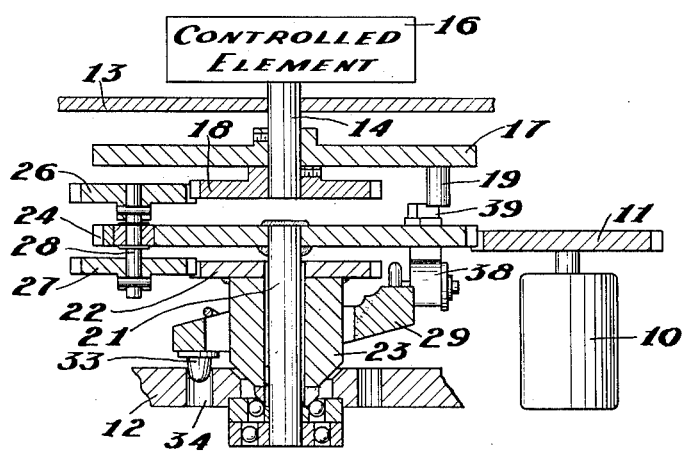
Figure 2 is a sectional view taken through the apparatus of Figure 1 and showing it in the low speed position; and, Figure 3 is a detailed view illustrating the engagement made in the high speed position.

Figure 1 illustrates a driving means 10, as for example, an electric motor which has its output shaft connected to a driving gear 11. A pair of base plates are designated as 12 and 13, respectively. A controlled shaft 14 is rotatably supported by the plate 13 and is attached to a controlled element 16. The controlled element 16, might be for example, a variable condenser with a rotor mounted on the shaft 14.

A relatively large plate 17 is rigidly attached to the shaft 14 and a smaller gear 18 is rigidly attached to the shaft 14 adjacent plate 17. A pin 19 extends downwardly from adjacent the outer periphery of the plate 17.

A shaft 21 is rotatably supported by the plate 12 with suitable bearings, and a gear 22 is rotatably mounted thereon. A gear 24 is rotatably attached to the shaft 21 and is driven by the gear 11 attached to the driving means 10.

A pair of gears 26 and 27 respectively, are rigidly mounted on a shaft 28 which is rotatably supported at the outer periphery of the gear 24. The gears 26 and 27 engage gears 18 and 22, respectively, and the teeth ratio of gears 26 and 18 is slightly different than the teeth ratio of gears 27 and 22. A collar 23 is rotatably supported about shaft 21 on suitable bearings and is rigidly attached to gear 22.

The collar 23 has a locking yoke 29 pivotally attached thereto by a pin 31 and a spring 32 biases one end to a down position. One end of the yoke 29 has a downwardly extending pin 33 which is receivable in one of a series of openings 34 formed in the plate 12. The opposite end is formed with a pair of cam surfaces 36 that go upward to a point.

The gear 24 has a projection or roller 37 supported to the under side by a bracket 38 which is engageable with the cam portion 36 so as to pivot the yoke 29 to the position shown in Figure 1 at the peak of the cam. It is to be noted that this lifts the projection 33 out of engagement with the plate 12.

The plate 17 has a downwardly extending pin 19 which is engageable with a dog 39 attached to the upper portion of gear 24. The member 39 engages the pin 19 when the roller 37 has pushed the yoke 29 to the position shown in Figure 1.

In operation, when the dog 39 is in engagement with the pin 19 the driving means 10 drives the plate 17 of the control shaft directly through the pin 19 and dog 39. The control shaft 14 then has the same angular velocity as the gear 24.

However, if the direction of the motor 10 is reversed, the dog 39 will not drive the pin 19 until it has rotated approximately 360 degrees. The roller 37 will roll down the cam surface 36 allowing the spring 32 to push the projection 33 into an opening 34 formed in the plate 12. When this occurs the driving means 11 will drive the gear 24, and the gears 26 and 27 will transmit motion from gear 24 to the gear 18 and thus drive the control shaft 14. Since, however, the gear 22 is locked to the plate 12 by the pin 33, the angular velocity of shaft 14 will be much less when driven in this fashion than when direct drive through the pin 19 occurs. The relatively slow driving rate will continue until the gear 24 has made a complete turn so as to engage the other side of the pin 19. The roller 37 will then roll up the opposite cam surface 36 and lift the projection 33 out of engagement with the plate 12.

It is to be realized, of course, that if reversal of the driving means 10 is made prior to the time when the pin 19 is engaged by the projection 39 the slower rate will continue and the shaft 14 may be correctly positioned at slow speed by oscillating about the correct setting.

It is seen that this invention provides an automatic speed reducer which is shifted to a lower speed upon reversal of the driving means but which goes into a high speed after a predetermined driving time.

Although this invention has been described with respect to a particular embodiment thereof, it is not to be so limited as changes and modifications may be made therein which are within the full intended scope of the invention as defined by the appended claims.

I claim:

1. A speed reducer comprising, a driving means, a pair of base plates, a controlled shaft mounted in a first base plate, a first gear rigidly connected to said controlled shaft, a second shaft rotatably supported in the second base plate, a collar rotatably mounted concentric about said second shaft, a locking yoke pivotally supported on said collar, a downwardly extending pin attached to one end of said yoke and receivable within an opening formed in said second base plate, a second gear attached to said collar, a third gear attached to said second shaft, a pair of gears rigidly mounted to a third shaft which is rotatably supported adjacent the periphery of said third gear, one of said pair of gears engageable with the second gear and the other engageable with the first gear, a disc rigidly mounted to the first shaft, a downwardly extending projection mounted to the disc, a dog mounted to said third gear and engageable with the downwardly extending projection, and means for controlling the position of said yoke.

2. A variable speed driving means comprising, a pair of base plates, a controlled shaft rotatably supported in one of said base plates, a second shaft rotatably supported in the other base plate, a first gear connected to said second shaft, a driving means connected to said first gear to drive it, a collar mounted concentrically about the second shaft, a locking yoke pivotally supported on said collar, a downwardly extending pin connected to one end of said yoke, a plurality of openings formed in said second base plate about said collar with said downwardly extending pin receivable therein, an upwardly extending dog mounted on said first gear, a disc mounted on said controlled shaft, a downwardly extending projection attached to said disc and engageable with said upwardly extending dog, a second gear attached to said collar, a pair of gears rigidly attached to a shaft and rotatably supported adjacent the outer edge of said first gear, a third gear rigidly attached to said controlled shaft, the first of said pair of gears engageable with the second gear, the other said pair of gears engageable with said third gear, a bracket attached to the lower edge of said first gear, a roller rotatably supported in said bracket, and said roller engageable with one end of said yoke to move the downwardly extending pin from out of engagement with said second base plate.

3. A speed reducing mechanism which shifts into a lower gear ratio upon change in direction of rotation comprising, a pair of base plates, a controlled shaft rotatably supported in one of said base plates, a disc rigidly attached to said controlled shaft, a downwardly extending projection attached to said disc, a first gear rigidly attached to said controlled shaft, a second shaft rotatably supported in said second base plate, a second gear attached to the second shaft, an upwardly extending dog attached to said second gear and engageable with said downwardly extending projection, a driving means connected to said second gear to drive it, a collar rotatably mounted concentric about said second shaft, a third gear connected to said collar, a locking yoke pivotally supported by said collar, a pair of gears rigidly attached to a short shaft which is rotatably supported adjacent the periphery of the second gear with the first of said pair of gears engageable with the first gear and the other of said pair of gears engageable with the third gear, a downwardly extending pin attached to said locking yoke and receivable in openings formed in said second base plate, a roller attached to the underside of said second gear and engageable with the opposite end of said locking yoke when the upwardly extending dog is in engagement with the downwardly extending projection, and spring biasing means normally forcing said locking yoke down into engagement with said second base plate.

4. Apparatus according to claim 3 wherein said locking yoke has a roller engaging portion at one end which is generally concave upwardly from either side to a point to allow the roller to cam it downwardly from either side.

5. A variable speed driving means comprising, a pair of base plates, a controlled shaft rotatably supported in one of said base plates, a second shaft rotatably supported in the other base plate, a first gear connected to said second shaft, a driving means connected to said first gear to drive it, a collar mounted concentrically about the second shaft, a spring biased locking yoke pivotally supported on said collar, a downwardly extending pin connected to one end of said yoke, a plurality of openings formed in said second base plate about said collar with said downwardly extending pin receivable therein, an upwardly extending dog mounted on said first gear, a disc mounted on said controlled shaft, a downwardly extending first projection attached to said disc and engageable with said upwardly extending dog, a second gear attached to said collar which is rotatable on said second shaft, a pair of gears rigidly attached to a shaft and rotatably supported adjacent the outer edges of said first gear, a third gear rigidly attached to said controlled shaft, the first of said pair of gears engageable with the second gear, the other said pair of gears engageable with said third gear, a second projection supported from said first gear which is engageable with one end of said yoke to move the downwardly extending pin out of engagement with said second base plate.

HAROLD S. McGOWAN.

References Cited in the file of this patent

UNITED STATES PATENTS

| Number | Name | Date |
|---|---|---|
| 2,153,856 | Weydall | Apr. 11, 1939 |

FOREIGN PATENTS

| Number | Country | Date |
|---|---|---|
| 384,036 | France | Mar. 27, 1908 |
| 463,887 | France | Mar. 6, 1914 |